Aug. 22, 1950 W. H. COLBERT ET AL 2,519,547
COLORED MIRROR
Filed Nov. 3, 1947 3 Sheets-Sheet 1

INVENTORS
WILLIAM H. COLBERT
BY WILLARD L. MORGAN
Whittemore, Hulbert
& Belknap
ATTORNEYS

Aug. 22, 1950 W. H. COLBERT ET AL 2,519,547
COLORED MIRROR
Filed Nov. 3, 1947 3 Sheets-Sheet 3

*INVENTORS*
WILLIAM H. COLBERT
BY WILLARD L. MORGAN
*Whittemore, Hulbert*
*& Belknap* ATTORNEYS Patented Aug. 22, 1950

2,519,547

UNITED STATES PATENT OFFICE 2,519,547

COLORED MIRROR

William H. Colbert, Brackenridge, and Willard L. Morgan, Haverford, Pa., assignors to Libbey-Owens-Ford Glass Company, Toledo, Ohio, a corporation of Ohio Application November 3, 1947, Serial No. 783,724

13 Claims. (Cl. 88—105)

The invention relates to colored mirrors and refers more particularly to colored reflective objects of that type comprising a support and a layer on the support producing color by interference of light rays which strike the colored reflective objects.

Despite the wide possible use of colored reflective objects in decorations, sales displays, hollow objects such as shaped glassware and also buttons, there has been little use to date of such reflective objects due to the expense of producing them and the few shades available.

It is a further object of the present invention to provide colored reflective articles adapted to exhibit different visually effective colors as a result of light ray interference, the different color effects being the result of angularly disposed surfaces of the body to which color producing film is applied. The present application is a continuation in part of our prior copending application, Serial No. 473,473, now Patent No. 2,430,452.

The accompanying drawings will aid in the understanding of the invention.

In these drawings.

Figure 1:
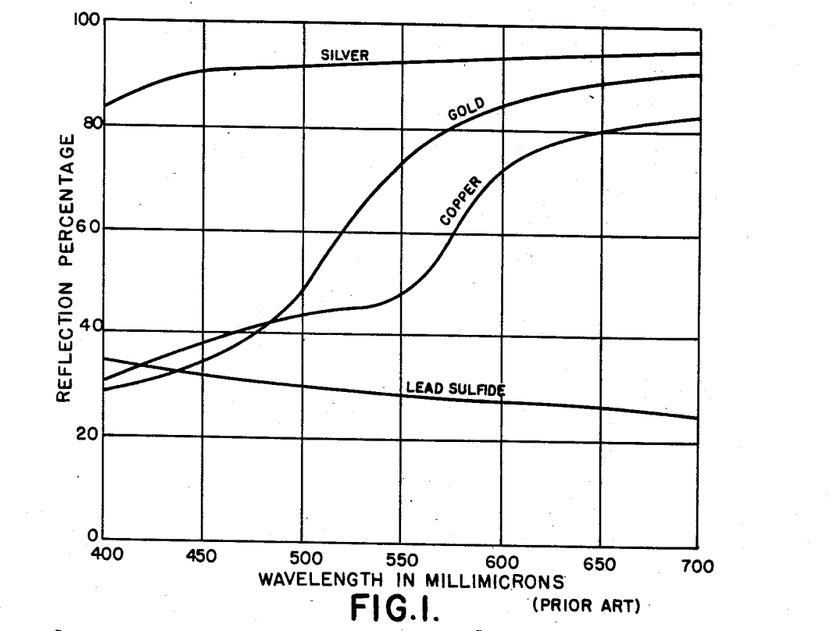
Figure 1 is a diagram showing spectral reflection curves for silver, gold, copper and lead sulfide mirrors of the prior art.

Silver mirrors of 88–92% reflectivity value made of clear ordinary plate glass have no color since all of the various light rays are reflected approximately equally as seen from the spectral reflection curve of Figure 1. Some colored mirrors have been made using plain plate glass in which the color arises from the selective reflection of the various light waves of different colors to different degrees. Gold and copper mirrors show spectral reflection curves as shown in Figure 1. The use of colored glasses is expensive and moreover, satisfactory quality for forming mirrors is not readily available. Gold mirrors are expensive and therefore have not gone into wide use while copper mirrors have not been commercialized due to the unreliable methods for their production.

The use of fuchsin or methyl violet dyestuffs in opaque layers for mirror surfaces has been suggested. The color in these mirrors arises solely by selective reflection; furthermore, mirrors of this type are not stable, the films rapidly breaking up and spotting and the color changing to muddy non-reflective grays. As the result, they have had no commercial use.

Mirrors made with platinum, iridium, or aluminum are silvery in appearance and without color while those made with chromium, silicon, or lead sulfide are dark and without color tone. Likewise, glass coated with asphalt or black paint with reflectivity values of 5%, and mirrors of black opaque glass with 5% reflectivity are not very useful because of their extremely low reflectivity values and the very dark images which thus appear in the reflective surfaces.

Thus, despite the wide possible use of colored mirrors and colored reflective objects, there has been little use to date because of the expense of producing such mirrors and reflective objects and also because of the few colors and shades available.

One of the objects of the invention is to provide colored reflective objects of a wide range of color characteristics and of a wide range of reflectivity percentage characteristics which can be controlled as desired.

Another object of the invention is to provide reflective objects of various colors and reflectivity values in which the colors are mainly or primarily secured by light interference effects and are permanent and inexpensive.

Further objects of the invention are to provide hollow reflective objects such as liquid-holding glasses and to provide decorative objects such as buttons of various colors, mainly or primarily secured by light interference effects.

Various other objects will be apparent from the following description.

The colors which appear in thin-walled soap bubbles and in very thin oil films do not arise from any inherent color in the soap or oil films. Also, the colors do not come from any selective color light absorption effects nor arise from any selective reflection of light since the soapy water and oil in bulk do not show any color directly and are clear and transparent and substantially non-reflective. The colors are known to occur from interference of the light rays which results in a neutralization or loss of certain colored lights so that the residual light appearing is colored. The particular color of light ray removed by interference is dependent upon the thickness of the film and its refractive index as will be shown later. It is well known that interference colors can only appear in extremely thin films which are of a thickness comparably to one-fourth the wave length of light and which are at least partially transparent.

We have found that by depositing reflective layers or coatings of various materials in extremely thin films which are partially or considerably transparent we can secure a wide range of colored objects of various reflective characteristics for the various rays of light and in terms of total light reflection. We can obtain these effects by simple and inexpensive means and colored substances or colored glass are not necessary. The colors are permanent and do not fade or alter as they are dependent upon physical light interference effects. We have found that by controlling the deposition of very thin uniform semi-transparent films of many materials we can secure reflective objects having a wide range of color and reflectivity characteristics. The material used as the reflecting substance need not have any inherent color.

Figure 2:
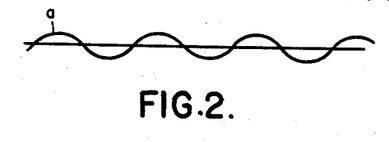
Figure 2 is a diagram illustrating light waves of a single ray of a definite color.

The development of colors by light interference has been explained upon the basis that light radiations are of a wave form, such as shown in Figure 2, which represents a single ray $a$ of definite color. Blue light differs from red in that the length of the waves is shorter, in the case of the blue, and longer, in case of the red. The other visible colored rays of light are of intermediate wave lengths. White light is composed of a mixture of all of these visible rays. If two rays $a$ and $a'$ of the same monochromatic type or wave length happen to be vibrating in the same wave phase, as in Figure 3, they amplify each other and the intensity is increased. However, if they happen to be vibrating in opposite phase, as shown at $a^2$ and $a^3$ in Figure 4, they interfere with or oppose each other and a loss of light intensity results. Thus, if in some way we can make some of the blue rays in ordinary white light get out of phase with other blue rays of the same wave length, we can remove some of the blue from the ordinary light. The remaining light will then no longer be white but of a color resulting from the remaining green, yellow, orange and red rays and will appear a reddish-yellow color.

Figures 3, 5:
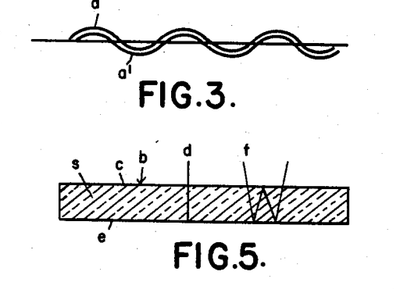
Figure 3 is a diagram illustrating light waves of two rays of the same type vibrating in the same wave phase.
Figure 5 is a diagram illustrating how various light rays will be reflected from a reflecting surface.
Figure 4:
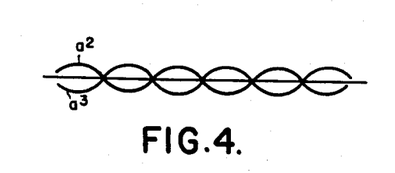
Figure 4 is a view similar to Figure 3 but showing the rays vibrating in opposite phase.

If we consider two light rays impinging upon a reflecting substance $s$, as in Figure 5, and assume that ray $b$ is reflected at the top surface $c$ while ray $d$ passes on through the semi-transparent base $s$ to the bottom surface $e$ before it is reflected, it is apparent that the second ray has had a longer path to travel before it again emerges from the top surface $c$ of the layer $s$. Thus, the ray $d$ lags considerably behind the ray $b$ and in consequence, the crests and troughs of the waves of the two rays may not necessarily coincide. The time difference between the waves of rays $d$ and $b$ can be arranged so that the difference in phase is such that interference of the waves of two of such rays, entering or being reflected at any point on the surface of $s$, will occur. The time difference between the waves of the two rays will be dependent upon the thickness of the layer $s$ and the speed with which the given light ray travels in the material comprising the layer $s$.

As the number of complete wave cycles which any given monochromatic light ray makes per second or its frequency is a fixed constant, the variation in speed of travel of the light ray in different media causes a shortening or lengthening of the actual length of a wave as it travels through the various media. Wave lengths for light are generally given with reference to their values in traveling through air and the speed of travel for all light rays in this medium is given as 299,910,000 meters per second. In denser materials, the light rays move slower and all the light rays do not necessarily move at the same speeds. The proportionality constant N between the velocity of light in a given substance and the velocity of light in air is called the refractive index for that substance.

$$N = \frac{\text{velocity in air}}{\text{velocity in substance}} = \frac{\text{wave length in air}}{\text{wave length in substance}}$$

If by $\lambda_a$ we indicate the wave length in air and by $\lambda_s$ the wave length in some other substance, it is apparent that these are simply related as follows:

$$\lambda_s = \left(\frac{1}{N_s}\right)\lambda_a$$

N varies somewhat with different monochromatic waves of different wave length but a similar equation holds for each wave length considered. In general, as the variations are usually small, a single constant for N can frequently be applied for all waves in the visible light range.

In order for the ray $d$ to come out of the top surface and be 180 degrees out of phase and to thus interfere with the ray $b$, assuming both rays to be striking the surface of the layer substantially at right angles, the ray $d$ must be slowed down in time and distance equal to the distance of one half of a wave length of the ray in air, i. e.

$$\frac{\lambda_a}{2}$$

As the ray is traveling only 1/N as fast in the substance $s$, comprising the layer, and must traverse the thickness of the layer twice, the thickness of $s$ required to cause an equivalent slowing effect is then $$\frac{\lambda_a}{4N_s}$$

In a similar way, thicknesses equal to 1, 3, 5 or any uneven integral multiples of this quantity should also show interference effects. If the ray $d$ is reflected within the layer $s$ not once but two times, it is apparent that the film needed for interference need be only $$\frac{\lambda_a}{8N_s}$$

thick. Thus as shown in Figure 5, wherein the ray $f$ is shown as an inclined ray striking the surface of the layer the light ray is reflected twice within the layer. If the ray is reflected any number of times, such as R times, then the film needed is thinner and is of a necessary thickness as given by $$\frac{\lambda_a}{4N_sR}$$

Furthermore, it is apparent that similar thicknesses equal to 1, 3, 5 or any uneven integral multiples of such quantities will show interference effects with rays which are multiply reflected within the layers. Thus, the suitable film thicknesses for our films are of the order of one-fourth of a wave length of any visible light ray or some small multiple or submultiple of this, divided by the refractive index of the material used in the film.

Since the various colored rays of light have different wave lengths and these range from 4000 to 7500 Angstrom units or 0.4 to 0.75 micron or thousandth millimeter in the visible spectrum, it is obvious that a film which is thick enough to cause interference with the short blue rays will not cause interference with the long red rays, etc. Thus, each thickness of film will take out certain defined portions of the spectrum and a film will take on a series of different colors as the thickness is varied. As will be shown in the examples which follow, the colored mirrors and reflective objects of the invention produced by light interference, show varied colors, depending upon the thickness of mirror film employed. In the spectral reflection curves for these mirrors, the portion of the curve and minima of reflectivity caused by interference shifts from the blue range of wave length toward the red, as the film is made thicker. The film must be of very uniform thickness, if the color is to be the same throughout the mirror. This has called for special means of producing such mirrors, in view of the extreme uniformity and extreme thinness of the mirror layers desired. On the other hand, it is within the scope of our methods to produce colored mirrors and reflective objects of mottled or variegated colors where the film thicknesses are deliberately varied to cause such effects.

Interference effects in perfectly transparent materials do not occur beyond about the ninth multiple of the one-quarter wave length factor already described. In semi-transparent materials, the increasing absorption of light by the increasing thickness of film, which is exponential with respect to the thickness, may soon leave so little light reflected from the bottom surface $e$ that no interference effect can be found in the reflected light which is then coming entirely from the top surface $c$. Obviously, if a mirror film is opaque, all of the light is absorbed before ever striking the surface $e$ and therefore no light is thrown back to cause interference effects particularly as the film obviously must be traversed twice if interference is to be obtained. The occurrence of interference by multiple reflection within the layer or film as shown in Figure 5 with ray $f$ is very quickly limited by the transmission values for the layer or film.

It is thus apparent that the amount of light which may be reflected from the bottom surface $e$ of the semi-transparent mirror film is a function of the transparency of the material used, for the wave length being considered or the wave lengths constituting ordinary visible light. As this is the light available for interference in most cases for our mirrors and reflective objects, we use films which are semi-transparent or which show a transmission between 10 and 90% in the thicknesses employed.

The amount of light reflected from the top surface of the layer is a function of the refractive index, being greater the larger the refractive index for the substance, and it also becomes greater as the thickness of the film increases until it is opaque. While it may thus be an advantage to use a material for the mirror film which has a high refractive index to secure greater brilliancy of reflection and to permit the use of thinner, more transparent films, thus giving greater efficiency of light removal by interference and thus giving purer and deeper color tones, we do not restrict ourselves to the use of any particular range of refractive index materials but may use a wide range of substances. It is apparent that a material of about 50% reflectivity value, when viewed in a normally opaque thick film which can be laid down in very thin films which are of high transparency, will show the brightest and deepest interference colors as mirrors. We may, however, use materials which in their ordinary opaque films or in bulk show much higher or lower reflectivity values than this and are not restricted to any range in this constant, although values lying between 80 and 20% are preferred. Thus, thin calcium fluoride coatings will reflect something less than 10% of the light at the top surface and are very transparent and the reflected light coming from the back surface causes interference colors to develop but the depth of color resulting is low due to the white light mixed with the colored light being of a high intensity. It is necessary that the film used for our mirrors and reflective objects have the characteristic of giving specular or mirror type reflection of light since diffuse type of reflection is not satisfactory.

We have found the use of very thin films of lead sulfide to give particularly attractive results. In its use in the normal opaque mirrors of fairly thick films, it is a practically colorless mirror, as shown by Figure 1, which shows the reflectivity, about 30%, for all the wave lengths of light to be about the same. It has a high refractive index of 3.9 and is quite transparent in the thicknesses which will cause interference effects. Gold, having a refractive index of 1.18 at 4400 Angstroms and of 0.47 at 5890 with a normal reflectivity curve, as shown by Figure 1, is quite transparent in very thin films to green light. So also is copper which reflects, as shown in Figure 1, when in opaque films and which has a refractive index of 1.10 at 5000 Angstroms and 0.44 at 6500. Both of these may be used by us in providing mirrors of a range of colors, when used in films which are semi-transparent and which are sufficiently thin to cause color development through light interference effects. Other sulfides of a metallic luster, such as stibnite and molybdenite, having a refractive index of 4.3, and each of about 40% general reflectivity in the visible range with a slight bluish cast, are quite suitable. Pyrite, which reflects a maximum of 60% in the red and a minimum of 45% in the blue, may be used as may also silicon, normally of about 38% reflectivity, and having a refractive index of 3.8 to 4.2. Antimony, having a refractive index of 1.62 and a reflectivity of about 55%, can possibly be used. Fluorite or calcium fluoride, having a refractive index of 1.43, and other fluorides of about the same refractive index, may be used as a reflective layer, although these very transparent substances are of low reflectivity values, as previously mentioned. Thus, for fluorite the estimated reflectivity value would be 3 to 4% uniformly throughout the visible range and very thin films of this material give low reflectivity value reflectors of this order which are of light interference tints.

It is also possible to use films, which are in the desired extreme thin range and which cause interference coloration of mirror type reflectors, in which the film is a jointly deposited mixture, chemical combination, or alloy of film-forming materials. For example, a jointly deposited mixture of gold and lead sulfide is suitable. It is obvious also that two or more extremely thin laminae, both semi-transparent, of two different substances may be used cooperatively to secure the interference colors.

While no color need be present in the material used as the reflecting substance, such as in the case of lead sulfide, the use of such materials as gold, showing selective specular reflection, brings an additional source of possible variation of both the hues and spectral reflectivity characteristics. The choice of a material for the reflective film which has color characteristics in its normal reflection, such as gold, imposes its normal reflection spectral limits, to some degree, on the general nature of the light reflected by the film and from which various spectral components are then subtracted by the light interference effects, depending on the thickness of the film used and its refractive index. Thus, in general, mirrors made with a very thin gold film are of higher total reflective values and thus brighter, and also of particularly higher reflectivity in the yellow and red, than are similar mirrors having films of lead sulfide, although in each the color is derived, to a main degree, by the color interference effects in combination with the normal reflective characteristics. Thus, with the lead sulfide which, as a normal opaque mirror, reflects all colors about equally at around 30%, as shown in Figure 1, the interference mirrors secured do not greatly exceed 30% in reflectivity value and the whole spectral range of colors are found in the mirrors so produced. With the very thin copper film mirrors, in which interference is acting, the reflectivity values do not exceed 55% and the colors secured are mainly bright reds, the blue and green waves being definitely weak. Similarly, cuprite or cuprous oxide, which is a bright red and giving a reflectivity in bulk of about 20%. and has a refractive index of 2.7, can be used as film base for interference color development and mirrors of the complete spectral range can be secured. Ordinary cupric oxide has been found to be extremely satisfactory in making mirrors colored by light interference effects.

Not all materials may be used for the forming of our thin semi-transparent mirror films in order to produce interference colors. Silver has been the mirror material most widely used as the ordinary opaque type mirrors and has also been used some as a colorless transparent so-called "half-mirror." However, metallic silver is not useful for the making of our mirror films. This arises from the fact that all three factors which must be considered in producing our films are of extreme and unfavorable values: first, silver has high reflectivity, second, extremely high absorption capacity for light, and third, low refractive index, this being 0.17 for the visible range. Aluminum which is of equally high reflectivity and has a refractive index of 1.44 and a fairly high degree of opacity is also not useful in forming mirrors or reflective objects by interference for similar reasons.

While our mirrors receive their colors from the thin reflective film used, it is apparent that we can also modify the range and reflective characteristics secured by our mirrors, thus primarily colored by interference effects, by using in place of colorless glass, as the mirror support, a colored glass or other colored support body of transparent nature. The color absorption characteristics of the support will limit the total reflectivity percentage possible and shift the general tones of color in the direction of the color of the glass used.

In order to secure the necessary uniformity of thickness in the thin semi-transparent mirror films and thereby secure uniformity of color and reflectivity characteristics throughout a mirrored body and to secure control of the variation in thickness of the very thin films desired, we have found it necessary to develop special methods of forming our mirror film.

Where the mirror films are deposited chemically, the deposition reactions must be greatly retarded, as compared with former operations. Thus, the reaction mixtures and temperatures of deposition must be changed toward slowing down the entire deposition process so as to give more uniform and even development of crystal nuclei and even slower than normal rates of growth onto these nuclei.

Figure 6:
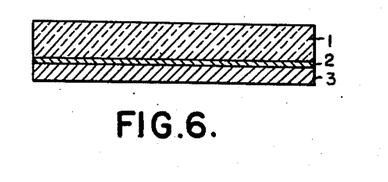
Figure 6 is a transverse vertical sectional view of a mirror made according to our invention.
Figure 7:
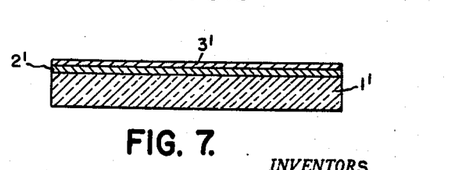
Figure 7 is a similar view showing a modified construction of mirror.

We find the deposition of our very thin films by thermal evaporation of the substance within a high vacuum to be a particularly attractive method as uniform results are readily secured and the control of the desired thickness is quite simple. As the extremely thin coatings are frequently quite fragile and easily scratched or otherwise spoiled, we generally coat these with a pigmented or other non-reflective paint, lacquer or shellac coating. This also eliminates viewing of the background through the semi-transparent mirror and prevents any appreciable amount of light passing through the mirror from back of the coating. The sectional views of Figures 6 and 7 illustrate second and first surface mirrors respectively, which consist of transparent or opaque glass 1 or 1' respectively, semi-transparent continuous mirror films 2 or 2' respectively, and protective coatings 3 or 3' respectively.

The nature of our new mirrors and their means of formation will be apparent from the following examples. In Examples 1 to 16, the mirror base material is lead sulfide deposited by special chemical means, the examples being of different film thickness and of consequent different colors and spectral and total light reflective characteristics, the various mirrors being secured by varying the time of deposition of the lead sulfide under controlled conditions.

*Examples 1 to 16*

Ordinary plate glass is thoroughly cleaned, scrubbed with rouge and then rinsed thoroughly several times. The wet glass is then ready for mirroring. The mirroring is carried out at 68 degrees Fahrenheit and the solutions, glass and machines are all brought to this temperature by doing all the work in a constant temperature room regulated to this condition. This gives uniform conditions and with the mirroring solution used, the deposition proceeds at a constant rate so that the thickness of deposit is determined by the time the solution is permitted to act. Three aqueous solutions are made up for use as follows:

Solution A, which contains 3.18% of sodium hydroxide and 0.00054% of sodium potassium tartrate. Solution B, which contains 3.7% of lead acetate and 0.264% of acetic acid. Solution C, which contains 2.64% of thiourea. These three solutions are mixed together in equal quantities just prior to their being poured onto the glass. The mixed solution at the time of pouring is of the following composition:

1.06% sodium hydroxide
1.23% lead acetate
0.88% thiourea
0.088% acetic acid
0.00018% sodium potassium tartrate As compared with the method of forming lead sulfide mirrors shown in the patent to Colbert et al., 1,662,564, of March 13, 1928, it is seen that we use a higher concentration of lead acetate and a lower concentration of thiourea. These changes have the effects of increasing to some degree the laying down of the nuclei uniformly and of slowing down the rate of reaction. These effects are also enhanced by the use of a tempressure of 68 degrees Fahrenheit in contrast to the 95 degrees or higher ordinarily employed in depositing lead sulfide mirrors. However, these changes alone have been found to be insufficient as it generally occurs, when mirror deposition is slowed down, that the securing of uniform deposits becomes more difficult. As it is particularly necessary that the thin mirror films be extremely uniform because of their consequent variation in color, if not, and also because of their semi-transparent nature, we have found it necessary to add a new substance having a retarding effect on the deposition rate and one which facilitates very uniform deposition. This substance is preferably sodium potassium tartrate. It is believed that the sodium potassium tartrate, which is used in very small amounts as it has a substantial effect, operates by possibly decreasing greatly the rate of growth of lead sulfide on already deposited nuclei. Thus, greater numbers of nuclei are apparently caused to form and the growth on these nuclei becomes slow and uniform in every direction and as a result a continuous deposit is formed. While the deposition rate of the formula of Patent 1,662,564 can be decelerated by working even below 68 degrees Fahrenheit or by using less alkali, neither of these procedures will give satisfactory uniformity for the making of good interference colored mirrors. The use of the small amount of sodium potassium tartrate is thus very desirable, although we have found that other materials may be used as retarders, as indicated in our said co-pending application.

In order to overcome the limiting of the amount of solution in contact with the glass at its edge by surface tension effects and the variation in deposit thickness at the edges, as a consequence, we have found it preferable, in order to secure very uniform results, to place the wet glass to be mirrored in a stainless steel pan, precoated with lead sulfide, and to rock the pan about 35 times a minute using a metal frame insert in the bottom of the pan to keep the glass from shifting. Approximately 2.8 cc. of mixed solution per square inch of glass to be treated is poured over the glass in the tray and the rocking keeps this liquid uniformly flowing over the surface of the glass during the entire deposition.

With our new mixed solution, after about 8.5 minutes from the time of pouring, a darkening of the glass can first be noticed and the thickness of mirror film becomes progressively greater as the time increases. If the deposition is allowed to proceed for about 60 minutes, a completely opaque ordinary type lead sulfide mirror is secured, in which the thickness of coating is about 0.140 microns. Mirrors of this thickness with lead sulfide are usually laid down in about 7 minutes, using the solution of Patent No. 1,662,564, and these mirrors show no color, as indicated by the spectral reflection curve of Figure 1, and are opaque. For the spectral reflectivity curve shown, the total reflectivity is 29%.

By adding a large amount of water to the pans at the times indicated in the following table, the mirrors comprising Examples 1 to 16 were made and are of the various colors and spectral and optical characteristics shown. Diluting the solution with a large amount of water stopped the deposition reaction. The mirrors were then flushed with considerable water and the surface cleaned by gently rubbing with wet cotton. After being dried, preferably by warm air, the films, which were semi-transparent as shown, were immediately coated with a black lacquer and then with a thick coat of a pigmented paint for protection against scratching or other destructive influences.

Figure 8:
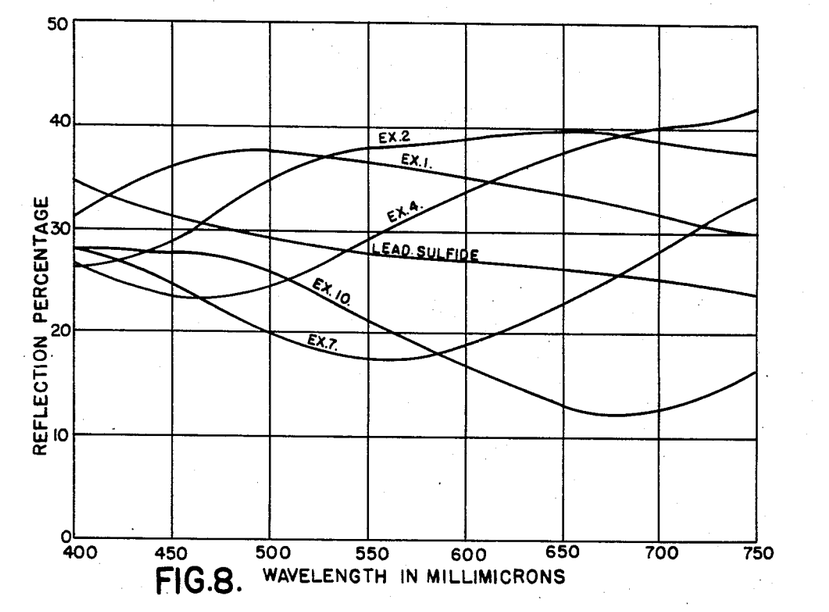
Figure 8 is a diagram illustrating spectral reflection curves of certain examples of mirrors made according to our invention.

Each of the mirrors was perfectly uniform in color and a good reflector. As will be seen in the table, the spectral range was gone through twice. In the first series of colors, as shown in Examples 1 to 11, the color tones are very clear and bright. The spectral reflectivity curves for Examples 1, 2, 4, 7 and 10 are shown in Figure 8, the numbering of the curves being the same as the example numbers. For comparison, the spectral reflectivity curve of the ordinary opaque film lead sulfide mirror given in Figure 1 is drawn into this set of curves, as well as into Figure 9 which shows the spectral reflectivity for colored mirror Examples 12, 14 and 16. The minima in the spectral reflectivity curves show the light rays which are being diminished in the reflected light by interference. As would be expected for interference effects, the minima continually shift in the samples toward the longer red rays as the film thickness of the lead sulfide in the examples is increased. In Examples 2 to 11, the film thickness, at which the interference minima occur with the different light waves, is related to the wave length by the ratio of $$\frac{\lambda}{4N}$$

The apparent color of the mirror is plainly dependent upon the color of the light removed by interference. Thus, in Example 10, the light removed by interference is in the red and, in consequence, the mirror appears blue since this is the main residual type of light.

| Example No. | Time of Forming, Minutes | Color | Total Per Cent Reflectivity | Total Per Cent Transmission | Spectral Minimum | Film Thickness, Microns | Wave Factors | No. of Times Ray Reflected |
|---|---|---|---|---|---|---|---|---|
| 1 | 12.3 | Bluish Gray | 33.8 | 45 | 7,500 | .024 | $\frac{\lambda}{8N}$ | 2 |
| 2 | 13.3 | Pale Yellow | 35.7 | 42 | 4,000 | .026 | $\frac{\lambda}{4N}$ | 1 |
| 3 | 14.2 | Bright Yellow | 34.4 | 40 | 4,400 | .028 | $\frac{\lambda}{4N}$ | 1 |
| 4 | 15.2 | Orange Yellow | 31.7 | 37 | 4,700 | .030 | $\frac{\lambda}{4N}$ | 1 |
| 5 | 16.1 | Red Yellow | 28.2 | 35 | 4,950 | .032 | $\frac{\lambda}{4N}$ | 1 |
| 6 | 17.7 | Purple Red | 24.9 | 33 | 5,250 | .034 | $\frac{\lambda}{4N}$ | 1 |
| 7 | 18 | Red Purple (Mauve) | 21.6 | 30 | 5,500 | .036 | $\frac{\lambda}{4N}$ | 1 |
| 8 | 19.4 | Purple | 21.2 | 20 | 5,900 | .038 | $\frac{\lambda}{4N}$ | 1 |
| 9 | 20.6 | Purple Blue | 20.9 | 26 | 6,300 | .040 | $\frac{\lambda}{4N}$ | 1 |
| 10 | 22.6 | Clear Blue | 19.8 | 23 | 6,850 | .044 | $\frac{\lambda}{4N}$ | 1 |
| 11 | 23.3 | Blue Green | 20.0 | 21 | 7,300 | .046 | $\frac{\lambda}{4N}$ | 1 |
| | | | | | 4,600 | .046 | $\frac{5\lambda}{16N}$ | 1 |
| 12 | 24 | Grayish Pale Yellow | 21.8 | 19 | 4,800 | .047 | $\frac{5\lambda}{16N}$ | 1 |
| 13 | 24.4 | Grayish Yellow | 23.2 | 18 | 4,950 | .048 | $\frac{5\lambda}{16N}$ | 1 |
| 14 | 25.6 | Grayish Red | 24.8 | 17 | 5,200 | .050 | $\frac{5\lambda}{16N}$ | 1 |
| | | | | | 7,200 | .050 | $\frac{3\lambda}{8N}$ | 2 |
| 15 | 28.5 | Grayish Purple | 24.8 | 16 | 5,800 | .056 | $\frac{5\lambda}{16N}$ | 1 |
| 16 | 33.2 | Silvery Blue | 21.8 | 12 | 6,700 | .065 | $\frac{5\lambda}{16N}$ | 1 |

Figure 9:
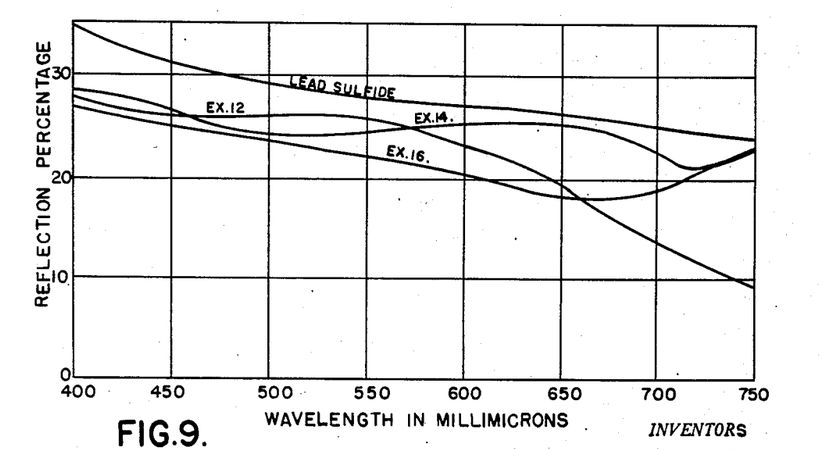
Figure 9 is a view similar to Figure 8 illustrating spectral reflection curves of certain other examples of mirrors made according to our invention.

The second spectral series of colored mirrors, namely, Examples 11 to 16, show minima in the reflectivity spectra at the thicknesses of film given which correspond to the ratio of $$\frac{5\lambda}{16N}$$

Interference at these thicknesses, would be only partial and the minima in the curves are very shallow. As a result, the colors are not of as bright or distinct tones as occur in the first series of mirrors.

In mirrors Examples 1 and 14, reflected interference rays and minima occurred in the deep red end of the spectra at film thicknesses corresponding to $$\frac{\lambda}{8N} \text{ and } \frac{3\lambda}{8N}$$

respectively. In these, the red rays were evidently reflected twice within the mirror film before emerging, as illustrated in Figure 5 by ray *f*. The lead sulfide film is highly transparent in the deep red and this higher transparency makes interference by the doubly reflected red rays possible.

As illustrated in Figure 7, where the films are extremely thin they show higher reflectivity values than the lead sulfide in its opaque films. Here the waves reflected at the even quarter wave length, differences of path which are in phase with the light being reflected at the surface, amplify the light intensity and as the films are extremely thin and highly transparent, a considerable amount of light is reflected from the bottom surface of the film which adds itself to the light reflected from the top surface. Thus, in Example 2, the red ray 6500 shows a reflectivity of 39.5%. In Figure 1, the opaque lead sulfide reflects this ray to the extent of 26.5% and hence 73.5% of the light goes inside of the mirror film. Example 2 shows a transmission of 42% and the film must be traversed twice. Consequently, the light reflected from the bottom surface of the semi-transparent mirror layer, which again gets out at the top surface of the lead sulfide layer, is 73.5%×0.42×0.42 or 13%, which added to 26.5% reflected from the top surface, gives a total of 39.5% reflectivity for the red 6500 by the Example 2 mirror. This amplification by reflection from the bottom layer is of smaller consequence as the films become thicker and less transparent.

*Example 17*

Figure 10:
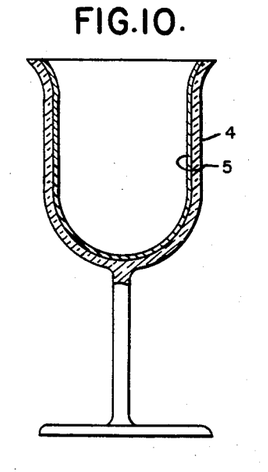
Figure 10 is a side elevation, partly in section, of a wine glass made according to our invention.

A wine glass, or other hollow glass article, of ordinary colorless glass may be thoroughly cleaned and brought to 68 degrees Fahrenheit and the mixed solution used in the previous examples flowed into its bowl 4 while maintaining agitation within the glass by a mechanical stirrer. In this way we can secure a reflective coating 5 on the interior of the glass article. It will be a clear blue color, if the solution is poured out at the end of 22.6 minutes and the action stopped by flushing the glass with water. In a similar way other shaped transparent articles may be given a colored metallic reflection and the color may be varied, as in the previous examples, by varying the time of deposition.

Figure 11:
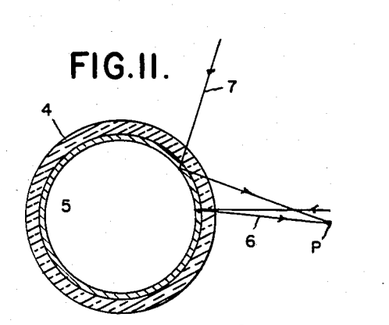
Figure 11 is a vertical section on the line 11—11 of Figure 10.
Figure 16:
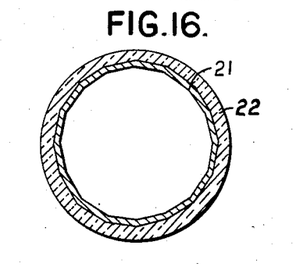
Figure 16 is a sectional view similar to Figure 11, showing a modified construction of wine glass.

Since the reflecting film or coating 5 is in this case applied to a surface, spaced portions of which are angularly disposed with respect to each other, an additional color effect is inherently obtained. Referring to Figure 11, it will be observed that ray 6, viewed at point P, traverses a path in the film equal to approximately twice the thickness of the film. However, ray 7, which is also viewed at point P, has traversed a much greater thickness of film, and hence may have an entirely different color. Thus in the case of a round bowl 4, there will be a gradual change in color over the surface of the bowl. The effect may be more striking if the inner or outer surface of the bowl is made up of angularly related plane surfaces or facets such as those illustrated at 8 in Figure 13. In Figure 16 the bowl 20 has its interior surface faceted and the interior surface is provided with the interference film 21. As suggested earlier, the inner surface of the interference film may if desired be provided with an opaque coating. The effect is more striking where the thickness of the film is a higher odd multiple of a quarter wave length film, such for example as 3 or 5 or 7.

*Example 18*

Figure 13:
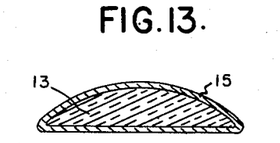
Figure 13 is a sectional view through a button embodying the present invention.
Figure 14:
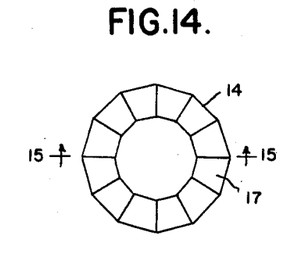
Figure 14 is a plan view of a button also embodying the present invention.
Figure 15:
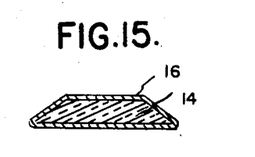
Figure 15 is a section on the line 15—15, Figure 14.

Plastic buttons 13 and 14 made from a plastic such as transparent methyl methacrylate or opaque phenol formaldehyde condensation material and which may be shaped as illustrated in Figures 13 to 15 are thoroughly cleaned and placed in the mixed solution used in the previous examples. The solution is preferably in a rotating container which continuously turns the buttons over. The solution may be drained out at the end of 15.2 minutes and the container flushed out with water. The buttons will be coated with and enclosed by a film 15 or 16 of lead sulfide which will be of such a thickness as to give a bright orange-yellow color. The resultant colored reflective buttons will have a high metallic reflection, the color of which may be varied as in the previous examples by varying the time of deposition.

Figure 12:
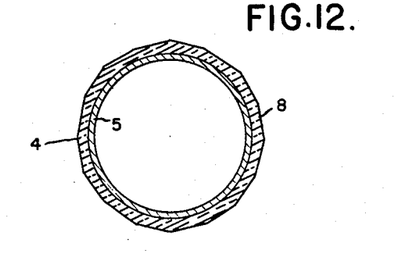
Figure 12 is a sectional view similar to Figure 11 showing a modified construction of wine glass.

Again, as described in connection with Figures 10 to 12, the angularly related spaced portions of the films will cause different color effects due to the different lengths of paths the light travels in the films to a single observation point. Also the color contrast may be enhanced by providing angularly disposed plane surfaces or facets as shown at 17 in Figure 14.

In every case the color produced by light ray intereference is continuous throughout the different areas of the article. It will be appreciated that depending upon the shape of the article, the color effect may be a substantially uniform color throughout an area, or it may be a graduated color effect which includes some or all of the colors of the spectrum. In the case of the article produced by a film having a variable thickness the color may be arranged to present a pattern. However, in all of the cases each element of the area is colored and the appearance of article is thus entirely different from an article having an iridescent surface characterized by the presence of isolated spots of color distributed over a surface of white or neutral appearance.

It will be apparent from the above description that we have provided colored mirrors or colored reflective objects of wide range of color characteristics and of wide range of reflectivity percentage characteristics which can be controlled as desired. The color values in the reflective mirror films are secured primarily by light interference effects and are permanent and inexpensive.

What we claim as our invention is:

1. A colored specularly reflecting opaque article having effective reflectivity to produce clear reflected images and also producing different visually effective reflective colors over different areas thereof and continuous reflective color throughout such different areas comprising support means including a shaped body having a surface sufficiently smooth to produce specular reflection, portions of said surface being angularly disposed with respect to each other, partially transparent continuous light interference reflective film means inherently producing color by light ray interference resulting when light incident upon said film means is transmitted through said film means from in front thereof and reflected back therethrough and interferes with the light reflected from the front surface thereof, said film means having a thickness falling within a range between $$\frac{\lambda}{8N} \text{ and } \frac{9\lambda}{4N}$$

inclusive, in which $\lambda$ represents a wave length of light at which said film means gives a minimum of reflected light and N represents the refractive index of said film means, and substantially light opaque means behind said film means, all of said means being superimposed in fixed relation to each other with adjacent means having their interfaces in intimate contact and one of said substantially opaque means and film means being on a surface of said support means, and said means immediately back of said film means having a sufficiently smooth surface in intimate contact with said film means and being of a refractive index sufficiently different from that of said film means to bring about specular image forming reflection of light back through said film means, said surface portions being angularly disposed with respect to a single point of observation so that light rays incident upon said different portions of said article and reflected forwardly at the rear surface of said film means to the single point of observation are caused to traverse said film means along paths which are of different lengths in said film means at said different portions and thus produce different visually effective continuous reflective colors and clear reflected images at said different surface portions of said article, which colors vary substantially in accordance with changes in angularity of said portions with respect to said single point of observation.

2. An article as defined in claim 1 to which said film means is of substantially uniform thickness.

3. An article as defined in claim 1 in which said film means is of gradually varying thickness to produce a graduation of color.

4. An article as defined in claim 1 in which said support means is opaque and the film means is applied to angularly disposed front surface portions thereof.

5. An article as defined in claim 1 in which the body is opaque and the film means is applied to angularly disposed exterior surface portions.

6. An article as defined in claim 5 in which the said surface portions are plane surface portions.

7. An article as defined in claim 1 in which said shaped body is transparent and is provided with flat facets on its front surface and said film means is applied to the rear surface thereof.

8. An article as defined in claim 1 in which said body is transparent and the surface portions to which said film means is applied is on the rear surface of that part of the body viewed by the observer.

9. An article as defined in claim 8 in which the film means is applied to a curved rear surface of the part of the article viewed by the observer.

10. An article as defined in claim 9 in which the front surface of the part of the body viewed by an observer is provided with flat facets.

11. An article as defined in claim 1 in which the body is a hollow transparent body having a concave inner surface, and the angularly disposed surface portions to which the film means is applied are at the inner surface thereof.

12. An article as defined in claim 1 in which the body is a bowl-like body and the surface portions to which the film means is applied are on the exterior surface thereof.

13. An article as defined in claim 1 in which the body is a bowl-like body of transparent material, and the surface portions to which the film means is applied are at the interior of the bowl.

WILLIAM H. COLBERT.
WILLARD L. MORGAN.

REFERENCES CITED

The following references are of record in the file of this patent:

UNITED STATES PATENTS

| Number | Name | Date |
|---|---|---|
| 1,425,967 | Hoffman | Aug. 15, 1922 |
| 1,607,622 | Higgins | Nov. 23, 1926 |
| 1,848,675 | Stimson | Mar. 8, 1932 |
| 1,858,975 | Ta-Bois | May 17, 1932 |
| 2,281,474 | Cartwright | Apr. 28, 1942 |
| 2,379,790 | Dimmick | July 31, 1945 |
| 2,394,533 | Colbert et al. | Feb. 12, 1946 |
| 2,422,954 | Dimmick | June 24, 1947 |

FOREIGN PATENTS

| Number | Country | Date |
|---|---|---|
| 17,058 | Great Britain | July 25, 1913 |

OTHER REFERENCES

Edwards: "Interference in Thin Metallic Films," Physical Review, vol. 38, July 1, 1931, pages 166–173 inclusive.